(12) United States Patent
Maddern et al.

(10) Patent No.: US 7,483,372 B2
(45) Date of Patent: Jan. 27, 2009

(54) COMMUNICATION NETWORK

(75) Inventors: Thomas Slade Maddern, Wimborne (GB); Richard John Proctor, Wimborne (GB); Geoffrey Chopping, Wimborne (GB); Henry Anthony Branfield, Great Missenden (GB); David Ian Scott, Solihull (GB)

(73) Assignee: Ericsson AB, Stockholm (SE)

( * ) Notice: Subject to any disclaimer, the term of this patent is extended or adjusted under 35 U.S.C. 154(b) by 534 days.

(21) Appl. No.: 10/499,394

(22) PCT Filed: Dec. 16, 2002
(Under 37 CFR 1.47)

(86) PCT No.: PCT/GB02/05703

§ 371 (c)(1),
(2), (4) Date: Aug. 15, 2005

(87) PCT Pub. No.: WO03/056846

PCT Pub. Date: Jul. 10, 2003

(65) Prior Publication Data
US 2006/0056289 A1      Mar. 16, 2006

(30) Foreign Application Priority Data
Dec. 21, 2001   (GB)   .............................. 0130729.7

(51) Int. Cl.
*G01R 31/08* (2006.01)
*H04J 1/16* (2006.01)
*H04J 3/14* (2006.01)
*H04L 1/00* (2006.01)
*H04L 12/26* (2006.01)
*H04L 12/28* (2006.01)

(52) U.S. Cl. .................... 370/230; 370/230.1; 370/231; 370/232; 370/233; 370/234; 370/235; 370/236

(58) Field of Classification Search ................... 370/230
See application file for complete search history.

(56) References Cited

U.S. PATENT DOCUMENTS

| | | | | |
|---|---|---|---|---|
| 5,048,011 A | * | 9/1991 | Melen | 370/422 |
| 5,231,631 A | * | 7/1993 | Buhrke et al. | 370/230 |
| 7,035,211 B1 | * | 4/2006 | Smith et al. | 370/230 |
| 2002/0041600 A1 | * | 4/2002 | Barri | 370/413 |
| 2002/0194362 A1 | * | 12/2002 | Rawlins et al. | 709/235 |
| 2004/0121013 A1 | * | 6/2004 | Storm et al. | 424/468 |

FOREIGN PATENT DOCUMENTS

| | | |
|---|---|---|
| GB | 2 236 641 A | 4/1991 |
| GB | 2 334 407 A | 8/1999 |
| GB | 2 334 408 A | 8/1999 |
| WO | WO 00/35239 | 6/2000 |

* cited by examiner

*Primary Examiner*—Steven H Nguyen
*Assistant Examiner*—Christopher Crutchfield
(74) *Attorney, Agent, or Firm*—Kirschstein, et al.

(57) ABSTRACT

A network has a plurality of nodes, wherein at least one of the plurality of nodes includes a switch arranged to carry out a Simple Transit Core Function and three or more of the plurality of nodes include a Single Link Interface which Single Link Interface has associated Output Attributes and/or Input Cognizant Attributes. Each Simple Transit Core Function at one node is not logically connected to another Simple Transit Core Function at another node. Each Simple Transit Core Function at one node is logically connected to at least three Single Link Interfaces at other nodes. The nodes including Single Link Interfaces which are connected to one instance of a node arranged to carry out a Simple Transit Core Function are controlled by respective Intercommunicating Connection Acceptance Control Processes according to the respective Output Attributes and/or Input Cognizant Attributes.

5 Claims, 1 Drawing Sheet

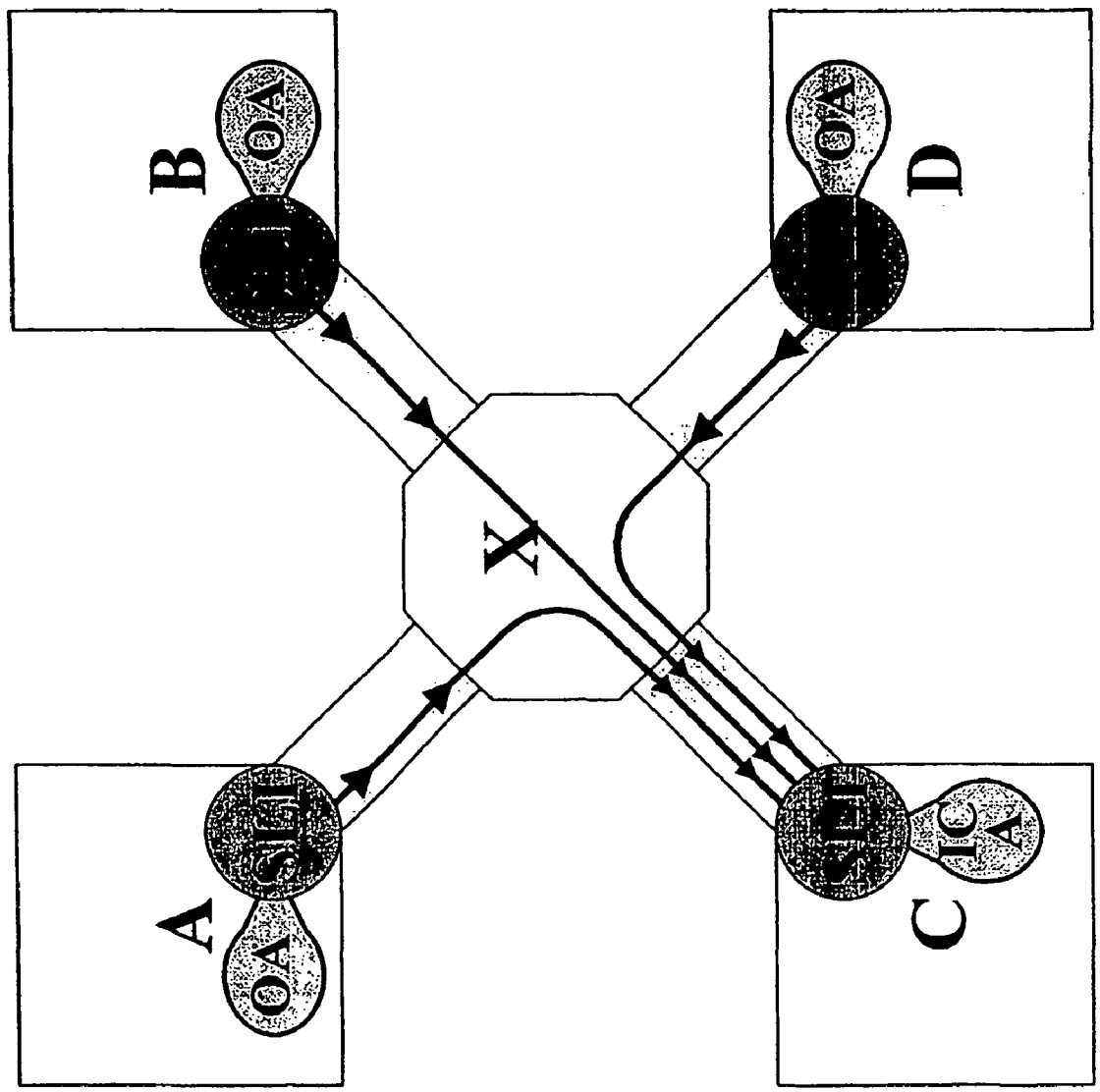

COMMUNICATION NETWORK

Packet-Traffic Optimisation (PTO) is a way of managing the traffic in a network using a mixture of Intelligent and Dumb switches.

Intelligent switches that understand the detail of the traffic they are carrying are more complex and hence expensive and it is much easier to make small Intelligent switches. Large switches can have problems due to the computational, throughput and fault tolerance problems of handling complicated call management for a lot of connections in a large node.

Provided (for the purpose of the PTO traffic) the network surrounds the Dumb switches with Intelligent switches, PTO allows the connection management of the Intelligent switches to manage the traffic through the Dumb switch.

In this context "Switch" can mean either Intelligent or Dumb switches such as routers, cross-connects, multiplexers, gateways or any other element of network equipment that can perform switching, routing or packet forwarding. The PSTN Traffic Optimisation concept was described in Patent Application No. GB 2334408A and Patents Nos. GB2343582B and GB2334407B. It used ATM switching, and in one case IP routing, to perform switching of 64 kbit/s or narrowband voice data.

The PTO concept is intended for connection oriented services, as the concept of connection acceptance is only meaningful for such services.

Examples of such services include those using Asynchronous Transfer Mode (ATM) or Multi Protocol Label Switch (MPLS), or Internet Protocol (IP), or Public Switched Telephone Networks (PSTN), provided they have a method for reserving network resources to fit the overall service requirements.

To control the allocation of bandwidth when carrying multiple connections, the normal practice is for each (Intelligent) switch to perform a Connection Admission Control (CAC) algorithm on the outgoing routed link of the switch to determine if the switch port was overloaded. Thus if 40 Mbit/s is requested for each of four connections from a port running at 150 Mbit/s, the fourth connection would be rejected. This type of analysis is performed at each switch as the connection is set up across the network.

Performing the CAC algorithm can be complex if the data is variable rate, but there are many established ways to perform this that depend on the calculation of the effective bandwidth of the traffic for the purposes of the CAC algorithm. This requires each switch to handle the signalling or other control means and be aware of each individual connection.

The intelligence to establish connections is moving from the core of networks, where there are computational bottlenecks, to the network edge where there is significant computational power due to its distributed nature.

Large core network switches can not afford the processing to deal with the CAC algorithms of all the short duration connections that may be established in a network.

The greater the number of Intelligent switches a connection is routed through, the longer the connection establishment time. By reducing the number of intelligent nodes the establishment time may be reduced.

For the purposes of the present invention, where a node includes a switching means arranged to carry out a Simple Transit Core (STC) function, the term Simple Transit Core (STC) function will be used to describe that function which may be included at some, or all, of the nodes of a network.

The inclusion of a Simple Transit Core (STC) function in all the nodes of a network will be further discussed as part of a patent application co-filed with this patent application, having our reference no. P/63204.gba, entitled "Communication Network" and describing a partially interconnected network comprising a plurality of nodes, which nodes include either;

(a) Allocated Nodes and Star Nodes (STARs), wherein the Allocated Nodes are each allocated to one of a number of Areas (AREAs) and the partially interconnected network also comprises point to point interconnections between the Allocated Nodes and the STARs, where the number of AREAs with Allocated Nodes interconnected to an individual Star forms the number of Routes (ROUTIEs) from an individual STAR, the Allocated Nodes of a first of the AREAs being interconnected to a set comprising some, but not all, of the STAR Nodes, and wherein further of the AREAs are similarly interconnected to further sets each comprising STAR Nodes and where there is at least one interconnection choice (CHOICE) between any two Allocated Nodes in different AREAs and where an interconnection route comprises two point to point interconnections interconnected in series by a STAR Node; or (b) at least six Topological Nodes, wherein a Topological Node is a single Physical Node or a group of interconnected Physical Nodes or part of a Physical Node or a group of interconnected Physical Nodes and parts of Physical Nodes, each Topological Node having at least three point-to-point Topological Links connecting it to some but not all of the plurality of Topological Nodes and where there is at least one Choice of routing between any two Topological Nodes and where a Choice of routing comprises either two point-to-point Topological Links connected in series at another of the Topological Nodes or a direct point-to-point Topological Link between the two Topological Nodes;

wherein at least one of the plurality of nodes includes a switching means arranged to carry out a Simple Transit Core Function and three or more of the plurality of nodes include a Single Link Interface which Single Link Interface has associated Output Attributes and/or Input Cognisant Attributes where each Simple Transit Core Function at one node is not logically connected to another Simple Transit Core Function at another node and each Simple Transit Core Function at one node is logically connected to at least three Single Link Interfaces at other nodes and wherein the nodes including Single Link Interfaces which are connected to one instance of a node arranged to carry out a Simple Transit Core Function are controlled by respective Intercommunicating Connection Acceptance Control Processes according to the respective Output Attributes and/or Input Cognisant Attributes.

Another term that will be used is Single Link Interface. A Single Link Interface may be included, or multiple instants may be included, at some, or all, of the nodes of a network.

The Simple Transit Core Function is a switching/forwarding capability at a node, which node does not provide for CAC in respect of at least the portion of the traffic through the node subject to PTO.

A Single Link Interface may have associated Output Attributes which can define the way that a Connection Admission Control Process will operate for a logical simplex link transmitting traffic to a Simple Transit Core (STC) function.

A Single Link Interface may have associated Input Cognisant Attributes which can define the way that a corresponding Control Process to the transmit Connection Admission Control Process, will operate for a logical simplex link receiving traffic from a Simple Transit Core (STC) function.

However, for a Single Link Interface, either the Output Attributes or the Input Cognisant Attributes, or both, must be present.

The processes that use the Output Attributes and the Input Cognisant Attributes to perform the Connection Admission Control functions are termed the Intercommunicating Connection Acceptance Control Processes, because in order to prevent overloading (e.g. packet loss) occurring at a Simple Transit Core (STC) function, a new connection should only be admitted provided that the limits defined by the Attributes are exceeded neither at the transmit end nor at the receive end of a simplex connection.

Where two simplex connections are used to make a duplex connection, they may be treated independently. A method was described in Patent Application No. GB2334408A and Patents Nos. GB2343582B and GB2334407B. Said method used ATM switching, and in one case IP routing, to perform switching of 64 kbit/s or narrowband voice and data and assumed that all connections were duplex.

According to the present invention there is provided a network comprising a plurality of nodes, wherein at least one of the plurality of nodes includes a switching means arranged to carry out a Simple Transit Core Function and three or more of the plurality of nodes include a Single Link Interface, which Single Link Interface has associated Output Attributes and/or Input Cognisant Attributes where each Simple Transit Core Function at one node is not logically connected to another Simple Transit Core Function at another node and each Simple Transit Core Function at one node is logically connected to at least three Single Link Interfaces at other nodes and wherein the nodes including Single Link Interfaces which are connected to one instance of a node arranged to carry out a Simple Transit Core Function are controlled by respective Intercommunicating Connection Acceptance Control Processes according to the respective Output Attributes and/or Input Cognisant Attributes.

The present invention will now be described by way of example, with reference to the accompanying single FIGURE, which shows a network having four intelligent nodes connected to a single dumb switch.

In order to simplify the description it will be generally assumed for this patent specfication that there will be nodes containing Single Link Interfaces which are the Main Processing (MP) nodes, which are nodes which have intelligence or associated intelligence to perform connection acceptance and these nodes will Intercommunicate with other Main Processing (MP) nodes to perform the Intercommunicating Connection Acceptance Control Processes according to the respective Output Attributes and/or Input Cognisant Attributes.

A Simple Transit Core (STC) function is basically a large switch, router or cross-connect which needs much less relative processing power than a Main Processing (MP) Node because no CAC is employed.

As shown in the figure there are four Nodes (A, B, C and D) around one Dumb switch X. They are all connected to the switch X and configured in a way so that there are virtual pipes to carry the data from each of Nodes A-D to the other nodes. In the FIGURE pipes carrying data from Nodes A, B and D are shown sending their data to Node C. Each of these pipes is established as far as Switch X to use the entire (or some restricted part of the) capacity between the Nodes A, B, C, D and the Dumb switch X. Thus it would appear that for this network there is three times as much capacity allocated as is available (if the links are all at the same rate). (This situation is sometimes referred to as "Bandwidth Over-booking). The Dumb switch X is only dumb for this PTO traffic, it could be carrying other traffic intelligently. The PTO can operate over the links at any selected rate, they do not have to be the same rate or the same proportion of link capacity.

Considering the establishment of a connection between Nodes A and C, Node A will check that it has sufficient capacity on its link to Switch X to carry the connection. Under normal non-PTO networks, the connection would then be checked at Switch X. Using PTO, at the time of connection set up Node A informs Node C of the required connection set up. Node C then checks that it has incoming capacity from Switch X to itself to support the connection.

For an ordinary constant bit rate duplex path, the analysis is just the same as if Node C was originating the connection itself from Node C to Node A. If there are sufficient resources on the link A to X and the link X to C, they are allocated to the connection which is established over the pipe from Node A to Node C.

The load on any physical link is controlled by running the Connection Acceptance Control Process at the terminating Node which connects to X rather than at Switch X.

The traffic across Switch X between any two intelligent nodes, referred to as a "pipe" can be carried on an ATM Virtual Path carrying VCs, it can be a ATM Virtual Circuit carrying many AAL2 channels, it can be a MPLS traffic flow, or it can be any large scale multiplexing of smaller connections. The individual load on the separate pipes can vary from 0 to 100%, but the total of all the pipes over the link can never be more than 100% or the proportion being used for the PTO.

It is possible to interpose fixed cross connect switches or multiplexers (for example SDH transmission cross connects or multiplexers or ATM cross connects) between the intelligent and dumb nodes, this does not affect the PTO concept provided that there is no contention for resources on such interposed switching elements.

In the simplest case using constant bit rate connections (e.g. Voice at 64 kbit/s) the connection acceptance at the nodes is a simple case of just adding up the number of connections in use. For more complex traffic that is of a variable data rate and which may be asymmetric in nature, then a full Connection Admission Control (CAC) will be needed for each simplex path, so a similar algorithm can be used on the input to a node including a Single Link Interface as is used on the output from a node including a Single Link Interface.

The part of the network controlled by the PTO principle, need not employ the whole capacity of the network: it can be any assigned part of the network capacity which may be controlled by label or identifiers; or it can be separated by priority or any other identifiable way.

Where nodes are either intelligent or dumb, but not combined, it is possible to mix intelligent and dumb nodes across a network, provided that the traffic never goes between two dumb nodes directly, as the particular segment of the path joining the dumb nodes is not controlled. Note the existence of fixed transmission cross-connects and multiplexers do not count as nodes in this respect as stated above. An intelligent node may provide control for connections both from and to that Node. Thus a path could go across a network as I-D-I-D-I-D-I or I-D-I-I-D-I, that is basically any route that does not have two adjacent dumb Nodes. So "dumb" nodes must be surrounded by "intelligent" nodes, the two "intelligent" nodes at the ends need not themselves be switches provided they are capable of operating under the control of the Intercommunicating Connection Acceptance Control Processes for the connections to and from them and could even be end terminal equipment or gateway equipment.

The Intercommunicating Connection Acceptance Control Processes do not themselves have to be placed in the nodes, they can be provided by third party separate intelligence, the only requirement is that a simplex path, between two nodes containing Single Link Interfaces, which passes via a node containing a Simple Transit Core function is under the control of Intercommunicating Connection Acceptance Control Processes for both ends.

Another benefit of PTO is when there is one, or more than one, alternative Simple Transit Core function that can be used to make a connection between a pair of intelligent nodes, both intelligent nodes having Single Link Interfaces connected to each of the alternative Simple Transit Core functions. In this case only the two intelligent nodes are involved in deciding which of the alternative dumb nodes should be used to make the connection.

Policing is a recognised ATM function. The following can also apply to shaping, which is also a recognised ATM function. Individual PTO connections cannot be policed at the dumb node, though the total PTO traffic may be policed as a whole at the dumb node (it should not be in error, except for genuine faults etc). This is because although the traffic on an individual connection may not be known, the dumb node may have a limit for the entire PTO traffic. For example 80% of the link is used for PTO, leaving 20% for other traffic, this 80% figure can be policed. Similarly the outgoing traffic could be shaped to fit onto for example 80% of an outgoing link.

Most of the present description has been with respect to packet switches, where the identification of the data is by the packet header and the Dumb switch simply uses some higher order part of the label to switch the data such as the VPI for ATM. However the PIO can be extended to circuit switches as well (e.g. for the 64 kbit/s based PSTN). There is at least one way the Dumb switch (the Simple Transit Core Function) can be externally controlled. A method is for the terminating Intelligent Switch (i.e. a node with a Single Link Interface with associated Input Cognisant Attributes) to instruct the Dumb switch as to which circuit the dumb switch had received, to send back to the terminating Intelligent switch There may be other methods.

PTO is applicable to any controlled bandwidth managed network, including, but not restricted to ATM, IP, MPLS, GMPLS, SDH and PSTN.

PTO is applicable to both constant and variable bit rate connections, provided that it can be ascertained that the connections do not exceed the proportion of capacity allocated to the PTO traffic on a link. One common method is to compute an effective bandwidth for each connection and then check that the available level has not been exceeded.

Because the PTO traffic is managed, it should not cause any outage such as overload, packet loss or Quality of Service degradation. Other non-PTO traffic (such as Unspecified Bit Rate traffic, for example) may be carried by the same network provided it is either handled at a lower priority or segregated in some way on the dumb nodes.

The PTO works for normal bi-directional connections, uni-directional connections, multi-cast and broadcast. Where a dumb node is acting as the fan out point, then it will be necessary to consider the available capacity on all the links involved with the connection. This maybe performed in an incremental fashion where the overall operation equates to adding or subtracting leaves to a multipoint connection. The dumb node will need to be configured with multi-cast connections which implement the required number of leaves.

ABBREVIATIONS

AAL2 ATM Adaptation Layer 2
ATM Asynchronous Transfer Mode
CAC Connection (or Call) Admission Control
GMPLS Generalised Multi Protocol Label Switch
IP Internet Protocol
MPLS Multi Protocol Label Switch
PSTN Public Switched Telephone Network
PTO Packet Traffic Optimisation
SDH Synchronous Digital Hierarchy
UBR Unspecified Bit Rate
VC Virtual Circuit

The invention claimed is:

1. A network, comprising: a plurality of nodes; at least two of the plurality of nodes including a switching means for performing a Simple Transit Core Function; three of the plurality of nodes including a Single Link Interface which has associated Output Attributes and/or Input Cognizant Attributes; the Simple Transit Core Function at one node being not logically connected to another Simple Transit Core Function at another of the nodes, the Simple Transit Core Function being logically connected to at least three Single Link interfaces at other of the nodes, the nodes which include Single Link Interfaces that are connected to one instance of a node arranged to perform a Simple Transit Core Function being controlled by respective Intercommunicating Connection Acceptance Control Processes such that at least one pair of the nodes including Single Link Interfaces is arranged to establish a connection between the at least one pair of nodes via an intermediate Simple Transit Core Function of an intermediate node, wherein there are at least two alternative Simple Transit Core Functions available for making a connection between one pair of the nodes including Single Link Interfaces, each of the pair of the nodes including Single Link Interfaces connected to each of the alternative Simple Transit Core Functions; and wherein only the pair of the nodes including Single Link Interfaces are involved in deciding which of the alternative Simple Transit Core Functions should be used to make the connection; a first node of the at least one pair being arranged to determine whether or not a link between the first node and the intermediate node supports a connection based on the Output Attributes; a second node of the at least one pair being arranged to determine whether or not a link between the intermediate node and the second node supports the connection based on Input Cognizant Attributes; and the connection being only admitted if both of the links support the connection.

2. The network as claimed in claim 1, wherein the Output Attributes and/or the Input Cognizant Attributes and the Intercommunicating Connection Acceptance Control Process associated with a particular Single Link Interface are not stored and not performed respectively by the Single Link Interface.

3. The network as claimed in claim 1, wherein any connected pair of nodes, which nodes are arranged to carry out a Simple Transit Core Function, are connected via at least one node which includes Single Link Interfaces.

4. The network as claimed in claim 1, wherein the connections are uni-directional, multi-cast, broadcast, or bi-directional.

5. The network as claimed in claim 1, wherein the network uses ATM, IP, MPLS, GMPLS, SDH or 64 k/bit/s for all or part of the network.

* * * * *

UNITED STATES PATENT AND TRADEMARK OFFICE
CERTIFICATE OF CORRECTION

PATENT NO. : 7,483,372 B2
APPLICATION NO. : 10/499394
DATED : January 27, 2009
INVENTOR(S) : Maddern et al.

It is certified that error appears in the above-identified patent and that said Letters Patent is hereby corrected as shown below:

In Column 1, Line 3, delete "Packet-Traffic" and insert -- Packet Traffic --, therefor.

In Column 2, Line 12, delete "(ROUTIEs)" and insert -- (ROUTEs) --, therefor.

In Column 5, Line 32, delete "PIO" and insert -- PTO --, therefor.

Signed and Sealed this

Twenty-seventh Day of October, 2009

David J. Kappos
*Director of the United States Patent and Trademark Office*